(12) United States Patent
Haskin

(10) Patent No.: US 7,059,078 B2
(45) Date of Patent: Jun. 13, 2006

(54) PROCESS FOR IMPRINTING A COMPOSITE VENTILATED RIB

(75) Inventor: Andrew F. Haskin, Barneveld, NY (US)

(73) Assignee: Ra Brands, L.L.C., Madison, NC (US)

( * ) Notice: Subject to any disclaimer, the term of this patent is extended or adjusted under 35 U.S.C. 154(b) by 0 days.

(21) Appl. No.: 10/939,175

(22) Filed: Sep. 10, 2004

(65) Prior Publication Data

US 2005/0115138 A1    Jun. 2, 2005

Related U.S. Application Data

(60) Provisional application No. 60/501,685, filed on Sep. 10, 2003.

(51) Int. Cl.
*F41C 27/00* (2006.01)
*F41A 21/00* (2006.01)

(52) U.S. Cl. .................. 42/112; 42/76.1; 89/16

(58) Field of Classification Search .......... 42/112, 42/76.1, 76.02; 89/16; 29/458, 527.2; 156/209, 156/219, 247; 264/284, 293, 299, 313, 316
See application file for complete search history.

(56) References Cited

U.S. PATENT DOCUMENTS 2,845,741 A * 8/1958 Day ..................... 42/76.01
3,107,450 A * 10/1963 Snyder et al. .......... 42/76.02
5,341,719 A * 8/1994 Bullis et al. ................ 89/16

* cited by examiner

*Primary Examiner*—Michael Carone
*Assistant Examiner*—Bret Hayes
(74) *Attorney, Agent, or Firm*—Womble Carlyle Sandridge & Rice, PLLC

(57) ABSTRACT

A method of forming a composite rib for the barrel of a firearm is provided. The method generally includes aligning composite material and a release layer and directing the combination of materials through a die. The release layer is removed from the intermediate rib leaving a three-dimensional finish formed in the surface of the rib.

17 Claims, 3 Drawing Sheets

PROCESS FOR IMPRINTING A COMPOSITE VENTILATED RIB

CROSS-REFERENCE TO RELATED APPLICATION

The present application claims priority to the filing date of U.S. Provisional Application Ser. No. 60/501,685, filed on Sep. 10, 2003 and which is incorporated by reference as if set forth herein in its entirety.

TECHNICAL FIELD

The present invention generally relates to composite pultrusions and in particular, to imprinting a composite ventilated rib for firearms.

BACKGROUND

Firearms, such as pistols and rifles, typically include a ventilated rib mounted on the barrel. Finishing of the outer surface of the ventilated rib is conventionally carried out by machining the rib. Machining the surface of the rib generally is acceptable for ventilated ribs made from metals, such as steel or aluminum. However, when the ventilated rib is formed of a composite material containing reinforcing fibers, machining the outer surface of the rib can remove resin and expose fibers at the rib's surface. Nonetheless, finishing of particularly the top surface of the rib is necessary to prevent light from reflecting across the top surface, which could impair the shooter's view of the sight and target.

Consequently, there is a need for a method for finishing or imprinting the surface of a composite ventilated rib.

SUMMARY

Briefly described, the present invention generally is directed to a method for forming a composite rib for a firearm such as a pistol, rifle or other long gun and imparting a three-dimensional finish to the surface of such a composite firearm rib.

In one aspect of the present invention, a method of forming a composite rib for a firearm is provided in which a release layer is aligned with a composite material, after which the release layer and composite material are protruded or extruded through a die to form a composite intermediate rib. The method also includes removing the release layer from the surface of the intermediate rib to which it has been applied, leaving a three-dimensional finish formed in the surface of the intermediate rib. Thereafter, the intermediate rib will be cut or trimmed to a predetermined length to form a rib for mounting to a barrel of a firearm.

In another aspect of the present invention, the method of forming a component of a firearm can comprise extruding or pultruding a combination of the release layer and the composite material through a die to form an intermediate part, and thereafter separating the release layer from a surface of the intermediate part leaving a finish formed in the surface. The method also includes reducing the intermediate part to a predetermined size to fit a firearm.

As a further alternative, the rib could be formed with the formation of a composite barrel or barrel section as an integral part thereof.

These and other aspects of the disclosure are set forth in greater detail in the detailed description below and the drawings, which are briefly described as follows.

DETAILED DESCRIPTION

Figure 1:
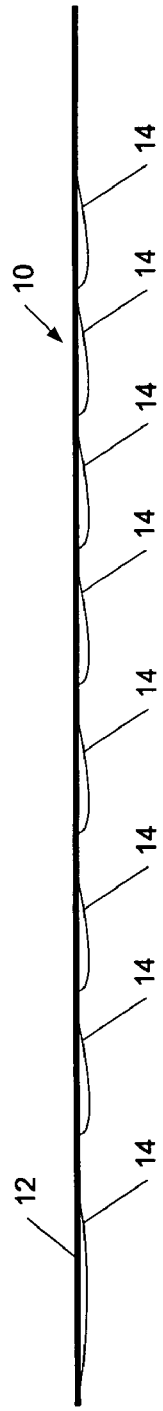
FIG. 1 is a side view of a ventilated rib for a firearm made according to a method that includes aspects of the present invention.
Figure 2:
FIG. 2 is a top view of the ventilated rib of FIG. 1.
Figure 3:
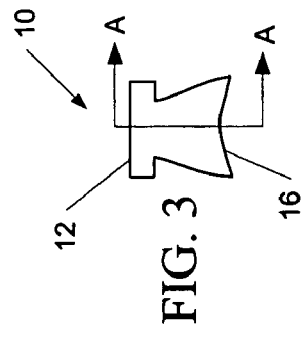
FIG. 3 is a front end view of the ventilated rib of FIG. 1.
Figure 4:
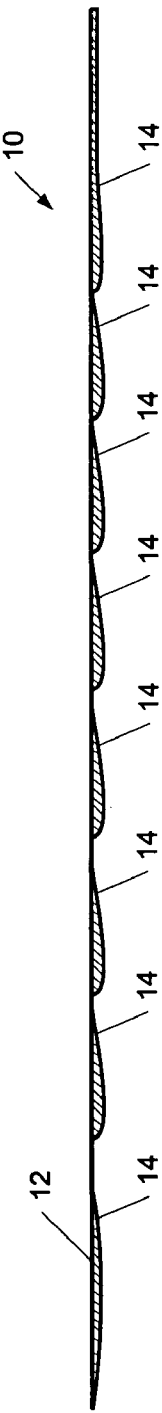
FIG. 4 is a cross-sectional view of the rib of FIG. 1 taken along line A—A.
Figure 5:
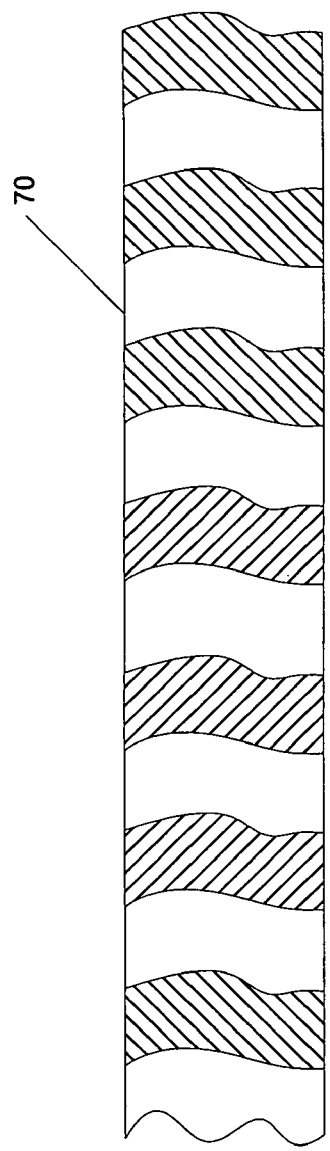
FIG. 5 is a top view of a portion of a release layer usable in a method that includes aspects of the present invention.
Figure 6:
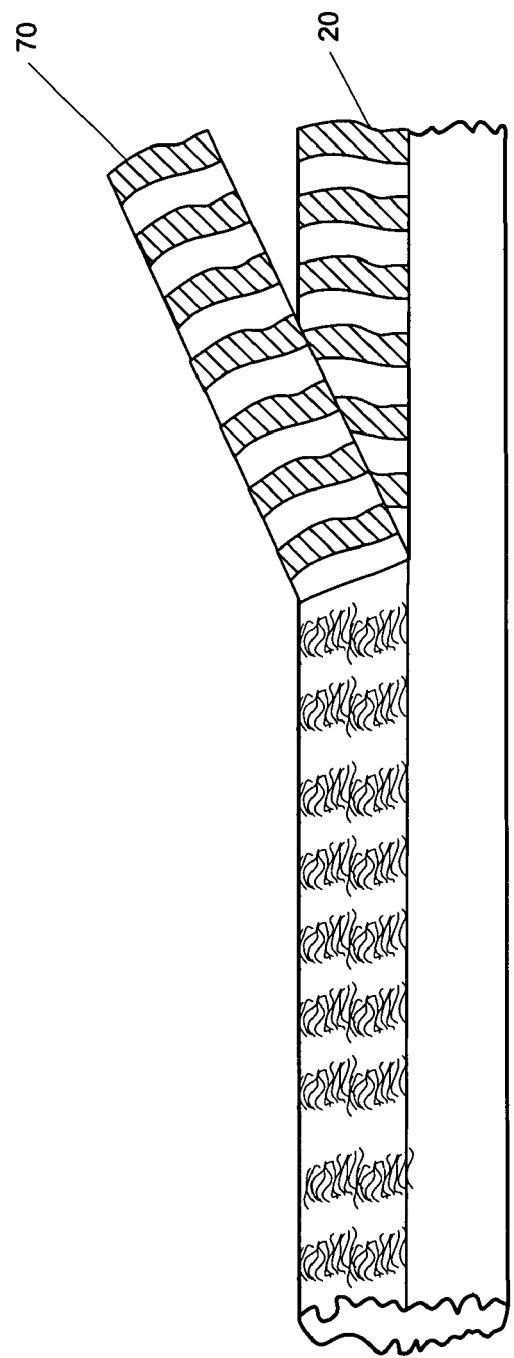
FIG. 6 is a perspective view of an intermediate rib and the release layer of FIG. 5.

Referring now to the drawings in which like reference numerals indicate like parts throughout the several views, FIGS. 1–7 illustrate features that are used in or produced by the methods of the present invention, which generally comprises methods of finishing one or more surfaces of a composite rib 10 for the barrel of a firearm, such as a pistol, rifle, shotgun or other long guns. The composite rib 10, which is shown as a ventilated rib in FIGS. 1 and 2, but which also can be unventilated or solid, includes a finish 50 formed or imprinted along one or more exterior surfaces, illustrated as the top surface 12 for purposes of illustration. The finish 50 can be a weave pattern to create a matte finish or any other pattern desirable, such as lettering, designs, shapes or other indicia.

The design generally is created by a release layer 70, which can be in the form of a strip or a ribbon and which has the desired finish or pattern imprinted or formed therein. The release layer 70 imparts the finish 50 to the composite rib 10 when the release layer 70 and the composite material used to form the composite rib 10 are directed through a die to form an intermediate rib 20. After pultrusion through the die, the release layer 70 can be removed from the intermediate rib 20 leaving the finish design formed in the top surface 12 thereof. The intermediate rib 20 can be machined, reduced and further processed or finished to form the composite rib 10 having the finish 50 formed thereon. The strength of the composite generally is not affected by the release layer and/or its removal from the rib, nor are there changes to design, size and placement of the reinforcing fibers within the composite rib from removal of the release layer, which leaves a surface finish 50 imprinted on the rib.

The ventilated rib 10 generally is manufactured using a continuous pultrusion process and can be formed as a separate, individual component, as illustrated in the drawings and discussed below. It will also be understood that the rib can be formed as an integral part or component of a composite barrel, such as disclosed in U.S. patent application Ser. No. 10/920,929 filed Aug. 18, 2004, which is incorporated herein by reference.

The rib 10 generally is formed of a composite material that includes one or more reinforcing fibers and a resin. The reinforcing fibers can be selected from glass, carbon, or polymeric fibers which can impart strength to the rib. For example, the reinforcing fibers can include glass fibers having 250 roving and 32 ends produced by Owens/Corning, and carbon fibers having 250 yield roving and one end. The reinforcing fibers generally are distributed in a resin matrix. The resin can include any conventional resin typically used in making composite materials. For example, the resin can be a vinyl ester, such as Interplastic 8182 or Hetron LB6875 from Ashland Chemical. The composite material has a glass content of about 60% to about 65% by weight and a resin content of about 35% to about 40% by weight. The density of the composite can be in a range of about 0.065 to about 0.075 pounds per cubic inch.

One or more surface veils 32 and 33 generally are applied to the composite material to form a boundary layer 35 that provides and asthetically appealing surface to the composite component. The boundary layer can be about 11 mils thick and typically is black, although other colors and thicknesses are contemplated.

The release layer 70 can have a grosgrain black finish and be about 0.31 inches wide with sizing. For example, the release layer 70 can be a #674 Special Ribbon from American Ribbon.

Figure 7:
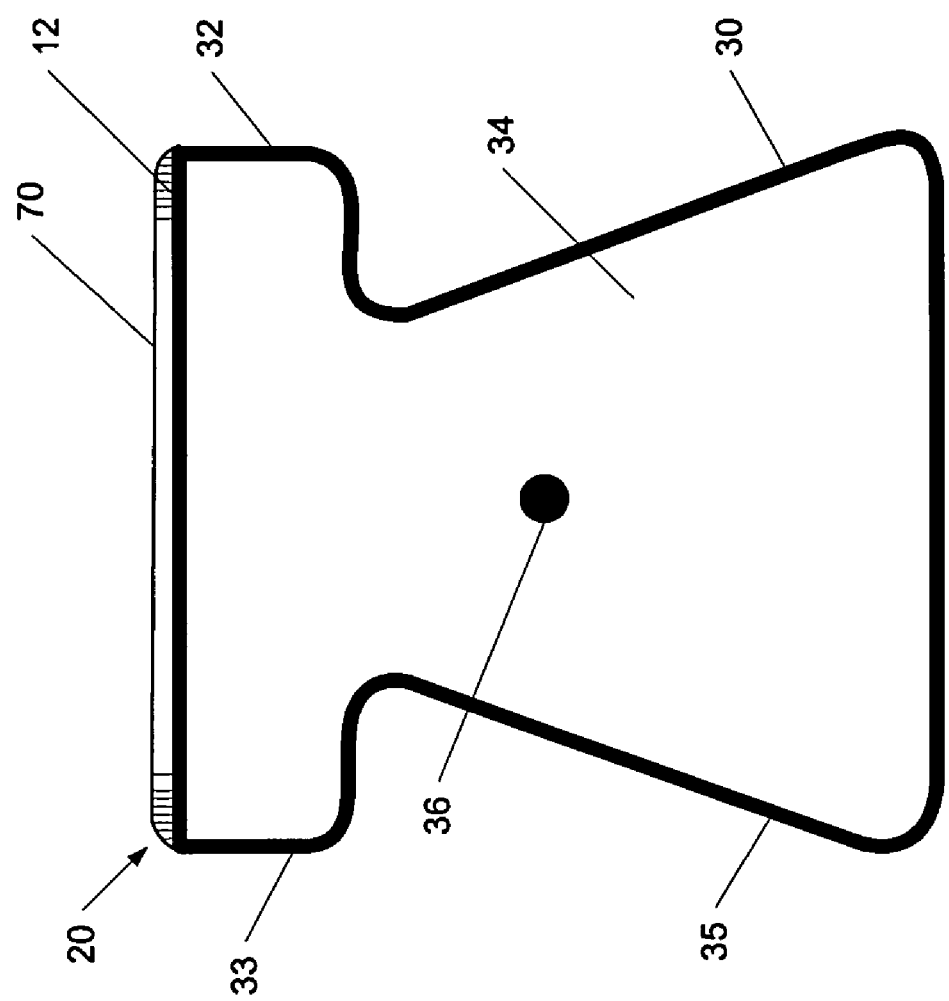
FIG. 7 is a cross-sectional view a combination of a rib and release layer usable in a method that includes aspects of the present invention.

The method generally includes providing a composite material, such as the material shown in FIG. 7 that includes glass rovings 34 and carbon rovings 36 orientated such that the carbon roving 36 is embedded in the glass rovings 34 and generally aligned in a parallel direction. The glass and carbon rovings 34 and 36 are "wet-out" in a bath of thermoset resin, such as polyester or vinylester. The surfacing veils 33 and 32 are aligned around the rovings 34 and 36 to form a boundary layer 35, while the release layer 70 generally is aligned adjacent the boundary layer 35. The combination of the release layer 70, boundary layer 35, resin and rovings 34 and 36 then are fed through the die of a pultrusion system or mechanism and is heated to about 225–320° F., for example 280° F. The cured resin is then pulled at 6 to 28 inches per minute (although other, lesser or greater rates also can be used as desired and depending on the materials used) through the die with either hydraulic or caterpillar style pullers to form an intermediate rib or component 20. The intermediate rib 20 typically then is cut to length and the release layer 70 is removed. Once the release layer 70 is removed, the matting pattern remains permanently formed on the rib. The intermediate rib 20 is machined to form the ventilations 14 and the barrel seat radius 16 to form the composite rib for use on the barrel of a firearm.

The method also can include forming the release layer 70 to impart the finish or pattern therein. For example, where the release layer 70 is a ribbon form from woven fibers. The method can include the step of weaving of the release layer. In one example, the release layer 70 is woven in a grosgrain pattern which gives the desired cosmetic effect to the top surface 12 of the composite rib 10. After imparting the pattern in the release layer 70, the layer can be sized by impregnating it with sizing agents, such as starch. The sizing is necessary to prevent the resin of the composite from "wetting-out" the release layer 70. The release layer 70 is sized when the components of the layer are of the type that could absorb the resin, such as, for example, cellulosic materials, such as cotton, wool, and rayon. The sizing prevents the resin from absorbing into the release layer 70, thereby allowing the layer to be removed easily from the top 12 of the intermediate rib 20. The texture, thickness and pattern of the ribbon are used to determine the matting pattern which remains. Other materials besides cellulosic materials can be used to form the release layer 70. For example, mylar, polyester, nylon, and aramid materials or fibers can be included in the release layer. The pattern, texture, thickness and or text further may be altered to leave various corresponding patterns or designs on the resultant pultrusion.

The patterns formed using the present invention generally are only limited by the capability of the ribbon weaving process applied to the thin sheet which is then placed over the bonded surface. The depth and width of the ribs in the cross grain weave are almost infinitely variable, insofar as the weaver is concerned. This flexibility can allow a protruded surface to be cosmetically altered with either a pattern or text.

In addition to thin sheets, further materials can be introduced which can be molded or produced in a variety of shapes, patterns or text and then inserted into a protruded component and then removed to leave the shape of the insert in the protruded part.

The present process eliminates the need to perform secondary machining operations which may be required to place insignia or designs on the gun barrel. The process provides the ability to add text to the protrusion that would otherwise have to be added to the surface of the secondary process.

It is to be understood that the above examples of are provided for illustration and are not to be construed to limit the scope of the disclosure. The disclosure encompasses modifications and alterations made by those of ordinary skill in the art to the disclosed examples.

What is claimed is:

1. A method of finishing a rib for a firearm comprising:
    aligning a release layer in a desired orientation with a composite material;
    pultruding the release layer and composite material through a die to form a firearm rib; and
    removing the release layer from a surface of the rib, wherein the rib includes a three-dimensional finish formed in the surface.

2. The method of claim 1 and further comprising cutting the rib to a predetermined length to form a finished rib for mounting to a barrel of the firearm.

3. The method of claim 1, further comprising providing a composite material comprising a reinforcing fiber.

4. The method of claim 3, wherein the composite material comprises a resin.

5. The method of claim 1, wherein aligning the release layer and composite material comprises aligning a boundary layer material between the release layer and the composite material.

6. The method of claim 1, further comprising providing a release layer comprising a material selected from mylar, aramid, cotton, rayon and combinations thereof.

7. The method of claim 1, further comprising providing a release layer comprising a cellulosic material and sizing material.

8. The method of claim 1, further comprising providing a release layer having a pattern or indicia formed therein.

9. The method of claim 1, further comprising machining the rib.

10. A method of forming a component of a firearm comprising:
    directing a combination of a release layer and a composite material through a die to form an intermediate part;
    separating the release layer from a surface of the intermediate part, wherein the surface of the intermediate part has a finish formed therein; and,
    finishing the intermediate part to form the component of a predetermined size for the firearm.

11. The method of claim 10, wherein directing a combination of a release layer and a composite material through a die comprises pultruding the combination.

12. The method of claim 10, further comprising providing a composite material comprising a reinforcing fiber.

13. The method of claim 12, wherein the composite material comprises a resin.

14. The method of claim 10, further comprising providing a boundary layer between the release layer and the composite material.

15. The method of claim 10, further comprising providing a release layer comprising a material selected from mylar, aramid, cotton, rayon and combinations thereof.

16. The method of claim 10, further comprising providing a release layer comprising a cellulosic material and sizing material.

17. The method of claim 10, further comprising providing a release layer having a pattern or indicia formed therein.

* * * * *